Patented Dec. 7, 1948

2,455,873

UNITED STATES PATENT OFFICE 2,455,873

MODIFIED WAX-COMPATIBLE ETHYLENE GLYCOL - TETRACHLOROPHTHALATE RESINS

Birger W. Nordlander and William E. Cass, Schenectady, N. Y., assignors to General Electric Company, a corporation of New York No Drawing. Application July 4, 1945,
Serial No. 603,268

6 Claims. (Cl. 260—22)

This invention relates to new and useful resinous compositions and to a method of preparing the same. More particularly, the invention is concerned with compositions comprising the resinous product of reaction of ingredients including (1) a glycol, e. g., ethylene glycol, diethylene glycol, etc. and (2) a chlorinated compound selected from the class consisting of tetrachlorophthalic acid and anhydride, said reaction product having incorporated therein a modifying substance selected from the class consisting of (a) fatty oils, e. g., castor oil, linseed oil, etc., (b) fatty acids having from 10 to 33 carbon atoms inclusive, e. g., capric acid, stearic acid, castor oil fatty acids, linseed oil fatty acids, dimelissic acid, psyllic acid, et., and (c) fats and waxes containing in free or combined state (e. g., as esters) the fatty acids defined in (b), for instance tristearin, beeswax, carnauba wax, etc. Compositions having marked flame resistance are obtained when the chosen glycol and modifier and the proportions of the glycol, tetrachlorophthalic acid or anhydride and modifier are such that the composition contains at least 30 per cent by weight of chlorine. The modifying substance is incorporated with the glycol and chlorinated compound under heat, and at least in part is chemically combined in the final product.

The resinous compositions of this invention are non-toxic, permanently fusible, compatible with waxes and have good electrical properties. They are especially suitable for use as a component of the compositions disclosed and claimed in the copending application of George J. Bohrer, Serial No. 603,239, filed concurrently herewith and assigned to the same assignee as the present invention now Patent No. 2,443,887.

It was known prior to our invention that tetrachlorophthalic anhydride forms a resin upon reaction with glycerol. While such resins have improved properties, specifically improved flame resistance, as compared with resinous reaction products of glycerol and phthalic acid or anhydride, their field of usefulness is limited due to the lack of flexibility of both the soluble, fusible and insoluble, infusible resins at room temperature. Furthermore, the glycerol-tetrachlorophthalic reaction products have at the most only limited wax compatibility and when compounded with waxes do not yield homogeneous mixtures. Also, such reaction products are not permanently fusible, but tend to become insoluble and infusible on prolonged heating at an elevated temperature, a property that is most undesirable for our purposes.

Reaction products of various glycols and tetrachlorophthalic acid or anhydride show improved flame resistance as compared with similar products derived from unchlorinated phthalic acid or anhydride, but are limited in usefulness by their other inherent physical properties. Thus, the reaction product of ethylene glycol and tetrachlorophthalic anhydride is very brittle at room temperature; the similar reaction product of diethylene glycol also is brittle at room temperature or slightly below, and is sticky at slightly above room temperature; and the similar reaction product of triethylene glycol is very sticky even at room temperature.

When a fatty substance such as a fatty oil or a fatty acid is incorporated into a glycerol-tetrachlorophthalic reaction product, the resulting material has increased wax-compatibility as compared with the unmodified product. However, because of the nature of the tri-functional alcohol glycerol, a relatively large amount of mono-functional fatty oil or fatty acid must be added to obtain a permanently thermoplastic or fusible end product, that is, to prevent cross-linking under heat. This relatively large amount of fatty oil or fatty acid results in decreased chlorine content of the product and unsatisfactory flame resistance.

We have discovered that resinous compositions which are flame-resistant, permanently fusible, compatible with waxes so that homogeneous mixtures can be obtained, and which have good electrical and other desirable properties, can be obtained by effecting reaction under heat between the ingredients identified in the first paragraph of this specification. Surprisingly it was found that, when tested on rats, the resinous compositions of our invention are non-toxic physiologically from contact and from ingestion, and also from absorption through the lungs over a prolonged period, more particularly from 4 to 8 weeks of the vapors resulting from heating these compositions at an elevated temperature, specifically about 325° C. This non-toxic property was entirely unexpected and in no way could have been predicted, since it is in striking contrast to the known toxicity of other chlorinated aromatic compounds, more particularly the chlorinated naphthalenes and chlorinated biphenyls. Since the rat in many of its physiological reactions has been found closely to parallel man, the practical significance of our discovery will be immediately apparent to those skilled in the art.

We have also discovered that decarboxylation occurs when the reaction mass is maintained at temperatures of the order of 220° to 250° C. for an appreciable period of time. (More specific information on the effect of temperature is given below.) This decarboxylation results in products having lower acid numbers and saponification numbers than are obtained when the reaction is effected by heating for a longer period at lower temperatures.

From their structures, both tetrachlorophthalic acid and mono esters thereof (produced by reaction of the anhydride with an alcohol) belong to the class of "sterically-hindered" aromatic acids (cf. Meyer and Sudborough, Berichte, 27, 3149 (1894)). Although we have found that tetrachlorophthalic acid and its mono esters undergo esterification at elevated temperatures (140° to 250° C.), the rate of esterification for these sterically-hindered acids is much lower than that of a non-sterically-hindered acid, e. g., unchlorinated phthalic acid. Hence when low-acid-number alkyd resins derived from tetrachlorophthalic acid or anhydride are desired in a reasonable period of time, we have found the following procedure to be of practical value:

Cook the reaction mixtures, examples of which have been given above, at a moderately high temperature, e. g., at about 180° to 210° C., until a product having an acid number of the order of 25 to 50 is obtained. At this point very little, if any, decarboxylation will have occurred. Then increase the temperature, completing the reaction within the temperature range of about 210° to 250° C. At the higher temperatures decarboxylation of the remaining carboxyl groups with the evolution of carbon dioxide takes place rapidly, yielding a resin having a very low acid number, more particularly from 0 to about 10. A correlation of the rate of decarboxylation with temperature is given below:

| Temperature, °C. | Rate of Decarboxylation |
| --- | --- |
| Below 200 | Insignificant. |
| 200–210 | Very slow. |
| 210–220 | Slow. |
| 220–230 | Moderate. |
| 230–250 | Rapid. |

This discovery with regard to the effect of heat on the decarboxylation of tetrachlorophthalic acid (or anhydride) during esterification to form a polyester thereof is general, and is not limited to modified glycol-tetrachlorophthalic reaction products of the kind described in the first paragraph of this specification. Thus it is equally applicable in the production of glycerol- and pentaerythritol-tetrachlorophthalic reaction products, unmodified and modified with other substances, e. g., fatty oils, fatty acids, fats and waxes such as hereinbefore mentioned, as well as in the preparation of unmodified glycol-tetrachlorophthalic reaction products.

Another method of effecting reaction between the ingredients comprises cooking the mixture for a relatively short period of time, e. g., about ½ to 1 hour at a relatively low temperature, e. g., about 140° to 160° C., and then increasing the temperature gradually over a period of about ½ to 1 hour to about 200° to 210° C. The reaction mass is heated at this higher temperature until a resin of the desired acid number, e. g., about 5 to 15 (or higher or lower as may be desired) is obtained. This usually requires a total heating period of the order of 9 to 18 hours.

In order that those skilled in the art better may understand how the present invention may be carried into effect, the following examples are given by way of illustration and not by way of limitation. Examples 1 to 4, inclusive, relate to the unmodified glycol-tetrachlorophthalic resinous materials while the remaining examples are directed to the modified glycol-tetrachlorophthalic reaction products, and show how their properties differ from the properties of the products of Examples 1–4. All parts and percentages are by weight.

EXAMPLE 1

|  | Grams | Moles |
| --- | --- | --- |
| Tetrachlorophthalic anhydride | 286 | 1 |
| Ethylene glycol | 68 | 1.1 | were placed in a three-necked, round-bottomed flask fitted with a thermometer, mechanical stirrer and gas-inlet tube and connected to a distillation condenser through a short, insulated column. While a steady stream of purified hydrogen was passed through the flask, the reaction mixture was heated with constant stirring for 12 hours. During this period of heating the reaction temperature was gradually raised from 160° to 181° C., and 14 cc. of aqueous distillate was collected. On cooling to room temperature a hard, glassy, brittle resin was obtained. This resin had an acid number of 48.5 and a saponification number of 325 (calculated 330). Petroleum waxes were not compatible with the molten resin. Asbestos impregnated with this resin yielded a product having adequate flame resistance, which was determined by holding the sample vertically in a hot flame from a Bunsen burner for 10 to 15 seconds, and noting that the sample did not continue to burn after the removal of the Bunsen flame. However, the resin-impregnated asbestos was very brittle, showing that the resin would not be suitable for use as an impregnant in the construction of for example asbestos-type cables.

A compound was prepared by mixing 84 parts of the above resin with 16 parts tricresyl phosphate. The cold flexibility of asbestos impregnated with this compound was poor, and the sample was slightly tacky. (Cold flexibility was determined by cooling the sample to 0° C. in a refrigerator and observing its behavior when bent around its own diameter. If the sample did not crack during this treatment, its flexibility was considered "excellent," a slight cracking of the impregnated sample was considered "good," pronounced cracking was considered "poor." The tack of the sample was evaluated by its feel at room temperature.)

A mixture was prepared by compounding 80 parts of the above resin, 10 parts tricresyl phosphate and 10 parts beeswax. The cold flexibility of asbestos impregnated with this compound was poor. Such a compound, like the compound described in the preceding paragraph, would be unsatisfactory for use as an impregnant in making, for instance, asbestos-type cables.

EXAMPLE 2

Same as Example 1 with the exception that 117 grams (1.1 moles) of diethylene glycol were used in place of 68 grams of ethylene glycol, and the heating period was 7 hours within the temperature range of 160° to 215° C. The resulting resin was hard and glassy at room temperature but was tacky at slightly above room temperature. It had an acid number of 75 and a saponification number of 288 (calculated 286). Petroleum waxes were not compatible with the molten resin. When asbestos impregnated with the resin was tested for flame resistance as described under Example 1, the sample continued to burn for some time after removal of the Bunsen flame, but eventually extinguished its own flame. The cold flexibility of the sample was poor, and it was slightly tacky at room temperature. A mixture of 87 parts of this resin with 13 parts tricresyl phosphate had better flame resistance and cold flexibility but was excessively tacky.

EXAMPLE 3

|  | Grams | Moles |
| --- | --- | --- |
| Tetrachlorophthalic anhydride | 388 | 1.35 |
| Diethylene glycol | 157 | 1.48 | were heated together for 6 hours with constant stirring under an atmosphere of purified hydrogen as described in Example 1. The temperature of heating was 160° to 248° C. The resultant resin was tacky at room temperature and was much less viscous when melted than the resin of Example 2. This difference in physical properties is believed to be the result of decarboxylation that occurred during heating at the elevated temperature (above 210° C.). Evidence that decarboxylation took place is given by the fact that the saponification number of the resin was found to be 244, although the calculated value is 296. This difference corresponds to 17.5% decarboxylation of all carboxyl groups originally present. The resin had an acid number of 10.3 and it was incompatible with petroleum waxes.

EXAMPLE 4

|  | Grams | Moles |
| --- | --- | --- |
| Tetrachlorophthalic anhydride | 572 | 2 |
| Triethylene glycol | 230 | 2.2 | were heated together to form a resin in a manner similar to that described under Example 1. Heating was continued for 31 hours at 150° to 208° C. (mostly at 175° to 200° C.). The resulting resin had an acid number of 43 and was a viscous fluid at room temperature. It was too tacky for practical use as an impregnant in producing, for example, asbestos-type cables.

EXAMPLE 5

|  | Grams | Moles |
| --- | --- | --- |
| Ethylene glycol | 35.6 | 0.515 |
| Tetrachlorophthalic anhydride | 157 | 0.548 |
| Beeswax | 40 | [1] 0.064 |

[1] Estimated.

were heated together for 4 hours at 173° to 240° C. as described more fully under Example 1. The resulting flame-resisting resin, which was hard and cloudy at room temperature, had a slightly waxy feeling. It possessed considerably more inherent flexibility and wax compatibility than the resinous product of Example 1. Its acid number was 39.8 and its saponification number 279 (calculated 284). A composition formed of 78 parts of this resin, 9 parts tricresyl phosphate, 8 parts beeswax and 5 parts ceresin wax was applied in molten state to asbestos-covered copper wire. The resulting impregnated asbestos insulation had good flame resistance, was free from tack at room temperature and was flexible at 0° C.

EXAMPLE 6

|  | Grams | Moles |
| --- | --- | --- |
| Ethylene glycol | 130 | 2.1 |
| Tetrachlorophthalic anhydride | 572 | 2 |
| Bayberry wax | 140 | [1] 0.144 |

[1] Estimated.

The above ingredients were heated together for 5 hours at 154° to 237° C. in a manner similar to that described under Example 1 with the exception that carbon dioxide was used in place of purified hydrogen as the inert atmosphere. The resulting resin was hard and slightly cloudy (at room temperature). It was flame-resistant, compatible with waxes and had better inherent flexibility than the resin of Example 1. A compound formed of 82 parts of the resin of this example, 10 parts tricresyl phosphate and 8 parts ceresin wax was applied in molten state to asbestos-covered copper wire. The impregnated asbestos covering had good flame resistance and was free from tack at room temperature.

EXAMPLE 7

|  | Grams | Moles |
| --- | --- | --- |
| Ethylene glycol | 130 | 2.1 |
| Tetrachlorophthalic anhydride | 572 | 2 |
| Vegetable stearin, specifically completely hydrogenated cottonseed oil | 140 | [1] 0.157 |

[1] Estimated.

were heated together for 4½ hours at 153° to 240° C. as described under Example 1, but using carbon dioxide as the inert atmosphere as in Example 6. The resulting flame-resisting resin, which had an acid number of 30, had properties quite similar to those of the resin of Example 6. Asbestos-covered copper wire was impregnated with a molten composition formed of 76 parts of the resin of this example and 8 parts of tricresyl phosphate, beeswax and ceresin wax. The impregnated asbestos showed good flexibility at 0° C. and was free from tackiness at room temperature.

EXAMPLE 8

|  | Grams | Moles |
| --- | --- | --- |
| Ethylene glycol | 118 | 1.9 |
| Tetrachlorophthalic anhydride | 572 | 2 |
| Castor oil | 140 | [1] 0.132 |

[1] Estimated.

were heated together for 4½ hours at 160° to 225°

C. The procedure was in general the same as that described in Example 1 with the exception that carbon dioxide instead of purified hydrogen was used as the inert atmosphere. The resulting flame-resisting resin had an acid number of 45 and was brittle and slightly tacky at room temperature. A compound formed of 82 parts of this resin, 6 parts tricresyl phosphate, 6 parts beeswax and 6 parts ceresin wax was applied in molten state to an asbestos-covered copper wire. The impregnated asbestos had good flame resistance.

EXAMPLE 9

|  | Grams | Moles |
|---|---|---|
| Ethylene glycol | 860 | 13.85 |
| Tetrachlorophthalic anhydride | 3,438 | 12 |
| Stearic acid | 341 | 1.2 |

The above ingredients were heated together for 8½ hours at 140° to 230° C. as described more fully under Example 1, but using carbon dioxide as the inert atmosphere instead of purified hydrogen. At temperatures above 220° C. the evolution of carbon dioxide from the reaction mass was noted. During the reaction period 266 cc. of aqueous distillate was collected. The acid number of the resulting hard, flame-resisting resin was only 1.7 and the saponification number was 299. The calculated saponification number for this resin was 323, the difference between these two values indicating that approximately 7.5% decarboxylation had occurred. A composition formed of 70 parts of this resin, 10 parts tricresyl phosphate and 20 parts of ethylene distearamide was applied in molten state to asbestos-covered copper wire. The impregnated asbestos insulation had good flame resistance, good flexibility at 0° C. and a waxy, non-tacky feeling. Ethylene distearamide is a synthetic wax (melting point 137°–139° C.) produced and sold by Glyco Products Company, New York, N. Y.

EXAMPLE 10

|  | Approximate per cent |
|---|---|
| Tetrachlorophthalic anhyride | 63.4 |
| Propylene glycol | 22.0 |
| Oleic acid | 14.3 |
| Triphenyl phosphite [1] | 0.3 |

[1] The triphenyl phosphite is an oxidation inhibitor and aids in preventing discoloration of the resin.

The above ingredients were heated together under a nitrogen atmosphere for 9½ hours at 200° to 210° C. The resulting flame-resisting resin had an acid number of 16 and a penetration value (200 gram weight, 5 seconds, 25° C.; method: A. S. T. M. Designation D5–25) of 68.

EXAMPLE 11

Same as Example 10 with the exception that 14.3% commercial stearic acid (about 95% acid) was used in place of oleic acid. The resinous reaction product was flame-resisting and had an acid value of 15. Its penetration number was 32 when determined in the manner described in Example 10.

EXAMPLE 12

|  | Approximate per cent |
|---|---|
| Ethylene glycol | 17.0 |
| Tetrachlorophthalic anhydride | 72.3 |
| Coconut oil fatty acids | 10.7 | were cooked together under a nitrogen atmosphere at 140°–160° C. for ½ hour, after which the temperature was raised to 200° to 210° C. The reaction was continued at this higher temperature until a resinous product having an acid value of 10 was obtained. The total reaction period was 17 hours.

It will be understood of course by those skilled in the art that our invention is not limited to the specific ingredients and proportions thereof that are given in the above examples. Thus, instead of tetrachlorophthalic anhydride we may use an equivalent amount of tetrachlorophthalic acid. Resinous compositions made as described in the examples but using an equivalent amount of a less highly chlorinated phthalic acid or anhydride instead of tetrachlorophthalic acid or anhydride are less flame-resistant than the resins of the examples.

Instead of the particular glycols named in the examples, other glycols may be employed, e. g., tetraethylene glycol, dipropylene glycol, 1,3 butylene glycol, etc. The ease of effecting reaction between, for instance, tetrachlorophthalic anhydride and the various glycols is a function of the glycol employed, as shown by the fact that ethylene glycol reacts more readily than diethylene glycol, and diethylene glycol more rapidly than triethylene glycol. We prefer to use ethylene glycol.

Various other fats, waxes, fatty oils and fatty acids may be used in place of the particular modifying substance mentioned in the individual examples, for instance tung oil, soya bean oil, oiticica oil, coconut oil, fish oils, perilla oil, cottonseed oil, sunflower oil, etc., the fatty acids of such fatty oils, undecylic acid, myristic acid, palmitic acid, margaric acid, arachidic acid, carnaubic acid, cerotic acid, lacceroic acid, montanic acid, linoleic acid, linolinic acid, etc., tallow and other animal fats, Japan wax, candelilla wax, palm wax, flax wax, cottonseed wax, spermaceti, etc.

The proportions of reactants may be varied considerably depending, for instance, upon the particular reactants employed and the particular properties desired in the final product. Ordinarily the glycol is used in a slight molar excess, e. g., a 10 or 15% molar excess, of that required for reaction with the tetrachlorophthalic acid or anhydride, but lower or higher amounts (e. g., as little as about 5% molar excess or as much as about 25% molar excess) may be employed depending, for example, upon the kind and amount of modifying agent employed. Stated alternatively, for each mol of the chlorinated compound, from about 1.05 to 1.25 mols of the glycol may be employed. The amount of modifier may be varied considerably, but usually will constitute from about 5 to 25% by weight of the total starting ingredients. When the resinous product is to be used in applications where flame resistance is a property of considerable importance, then the amount of modifier preferably is such that the amount of chlorine in the final resin is not below 30%, and preferably is from about 35 to 40%, by weight of the resin.

A requirement of an impregnating resin is that it be relatively non-volatile and thermally stable. Table I lists data obtained in testing the rate of evaporation at 150° C. of (1) a stearic acid-modified glycol-tetrachlorophthalic resinous reaction product similar to that described under Example 9 and (2) commercial hexachloronaphthalene, which is a toxic compound formerly used as a base material in preparing flame-proof impregnants.

Table I

Evaporation rates at 150° C.

[A. Commercial hexachloronaphthalene (weight, 44.2970 grams; area, 72.5 cm.²)]

| Time, Hours | Loss, Grams/cm.² | Rate of Loss, Grams/cm.²/hour |
|---|---|---|
| 8.2 | 0.0177 | 0.00216 |
| 23.2 | 0.0468 | 0.00201 |
| 27.5 | 0.0556 | 0.00204 |
| 43.0 | 0.0861 | 0.00200 |

[B. Modified tetrachlorophthalic resin (weight, 28.0075 grams; area, 91.7 cm.²)]

| Time, hours | Loss, grams/cm.² | Rate of loss, grams/cm.²/hour |
|---|---|---|
| 2 | 0.00117 | 0.000585 |
| 7 | 0.00356 | 0.000510 |
| 25 | 0.00899 | 0.000359 |
| 49 | 0.01520 | 0.000310 |
| 73 | 0.02160 | 0.000296 |
| 88 | 0.02680 | 0.000304 |

From the data in Table I it will be apparent that the modified tetrachlorophthalic resin has a lower volatility at 150° C. than commercial hexachloronaphthalene. Furthermore, unlike the latter compound, which is toxic, the modified tetrachlorophthalic resin is non-toxic.

The resinous compositions of this invention may be used alone or with other ingredients, e. g., a volatile solvent, in coating or coating and impregnating fabric and other textile materials, e. g., materials comprising natural or synthetic fibers. They may be employed as modifiers of other materials, e. g., waxes, natural and synthetic resins, etc., to impart improved properties thereto, as a component of varnishes, enamels, lacquers, paints and other liquid coating compositions, etc. Because of their wax compatibility they are especially suitable for use as a modifier of natural and synthetic waxes to form impregnating compositions that are particularly valuable as an impregnant of asbestos, mineral wool, glass fibers in yarn, felted, fabric or other form, paper, etc.

What we claim as new and desire to secure by Letters Patent of the United States, is:

1. A flame-resistant, wax-compatible, permanently fusible, resinous composition, containing from 30 to 40 percent, by weight, of chlorine, said composition being the resinous product of simultaneous reaction of ingredients consisting of (a) ethylene glycol, (b) tetrachlorophthalic anhydride, the ethylene glycol being present in an amount equal to from 1.05 to 1.25 mols per mol of tetrachlorophthalic anhydride, and (c) a modifying substance being at least in part chemically combined in the resinous composition and being selected from the class consisting of (1) fatty oils, (2) fatty acids having from 10 to 33 carbon atoms, inclusive, and (3) fats and waxes containing esters of the fatty acids defined in (2), the modifying substance being present, by weight, in an amount corresponding to from 5 to 25 per cent of the total weight of the starting ingredients.

2. A permanently fusible, wax-compatible, flame-resistant, resinous composition containing from 30 to 40 per cent, by weight, chlorine and which forms a homogeneous mixture with waxes, said composition being the resinous product of simultaneous reaction of ingredients consisting of (a) ethylene glycol, (b) tetrachlorophthalic anhydride, the ethylene glycol being present in an amount equal to from 1.05 to 1.25 mols per mol of tetrachlorophthalic anhydride, and (c) from 5 to 25 per cent, by weight, stearic acid, based on the total weight of ingredients (a), (b), and (c), the said stearic acid being at least in part chemically combined in the resinous composition.

3. The method of producing a permanently fusible, flame-resistant, wax-compatible, resinous composition containing from 30 to 40 per cent, by weight, chlorine, which method comprises heating together simultaneously to form a resin at a temperature within the range of 140° to 250° C., a mixture of ingredients consisting of (a) ethylene glycol, (b) tetrachlorophthalic anhydride, the ethylene glycol being present in an amount equal to from 1.05 to 1.25 mols per mol of tetrachlorophthalic anhydride and (c) from 5 to 25 percent, by weight, based on the total weight of (a), (b) and (c) of a modifying substance being at least in part chemically combined in the resinous composition and being selected from the class consisting of (1) fatty oils, (2) fatty acids having from 10 to 33 carbon atoms, inclusive, and (3) fats and waxes containing esters of the fatty acids defined in (2).

4. The process of preparing a permanently fusible, flame-resistant, wax-compatible, resinous composition containing from 30 to 40 per cent, by weight, chlorine, which method comprises (1) heating together simultaneously to form a resin at a temperature of from 180° to 210° C. a mixture of ingredients consisting of (a) ethylene glycol, (b) tetrachlorophthalic anhydride, the ethylene glycol being present in an amount equal to from 1.05 to 1.25 mols per mol tetrachlorophthalic anhydride, and (c) from 5 to 25 percent, by weight, stearic acid, based on the total weight of (a), (b) and (c), said heating being continued until an acid number of the order of 25 to 50 is obtained, and (2) thereafter further heating the resulting mixture within the temperature range of 220° to 250° C. until an acid value of from 0 to 10 is obtained.

5. The process of preparing a permanently fusible, flame-resistant, wax-compatible, resinous composition containing from 30 to 40 per cent, by weight, chlorine, which method comprises (1) heating together simultaneously to form a resin a mixture of ingredients consisting of (a) ethylene glycol, (b) tetrachlorophthalic anhydride, the ethylene glycol being present in an amount equal to from 1.05 to 1.25 mols per mol of the tetrachlorophthalic anhydride, and (c) from 5 to 25 per cent, by weight, based on the total weight of (a), (b) and (c), of a modifying substance selected from the class consisting of (A) fatty oils, (B) fatty acids having from 10 to 33 carbon atoms, inclusive, and (C) fats and waxes containing esters of the fatty acids defined in (B), said heating being conducted for a period of from ½ to 1 hour within the temperature range of 140° to 160° C. and (2) thereafter further heating the resulting mass by increasing the temperature gradually from 200° to 210° C. and maintaining this temperature until a resin having an acid number of about 5 to 15 is obtained.

6. The process of preparing a permanently fusible, flame-resistant, wax-compatible, resinous composition containing from 35 to 40 per cent chlorine, which process consists in heating to an acid number of 1.7 a mixture consisting, by weight, of 860 parts ethylene glycol, 3438 parts tetrachlorophthalic anhydride, and 341 parts stearic acid for 8½ hours at a gradually rising temperature of from 140° to 230° C., using carbon dioxide as an inert atmosphere, the said heating being conducted while the water of esterification resulting from the reaction is removed from the reaction mass.

BIRGER W. NORDLANDER.
WILLIAM E. CASS.

REFERENCES CITED

The following references are of record in the file of this patent:

UNITED STATES PATENTS

| Number | Name | Date |
|---|---|---|
| 1,864,909 | Jaeger | June 28, 1932 |
| 1,992,249 | Snyder | Feb. 26, 1935 |
| 2,106,523 | Ellis | Jan. 25, 1938 |

OTHER REFERENCES

Kienle et al., Ind. Eng. Chem., April, 1929 volume 21, pages 349–352.

Hovey et al., Paint, Oil and Chemical Review, vol. 102, page 38, January 18, 1940.